Sept. 1, 1953     J. A. WASSER     2,650,617
ELECTROMAGNETIC VALVE
Filed Sept. 7, 1950
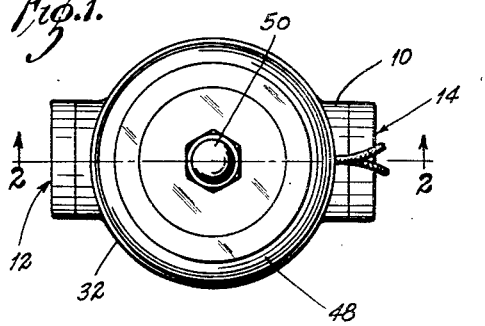
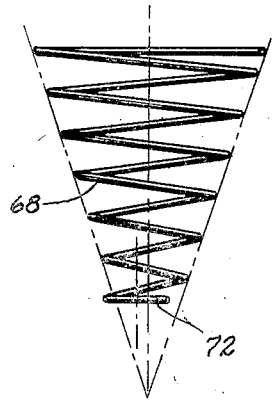
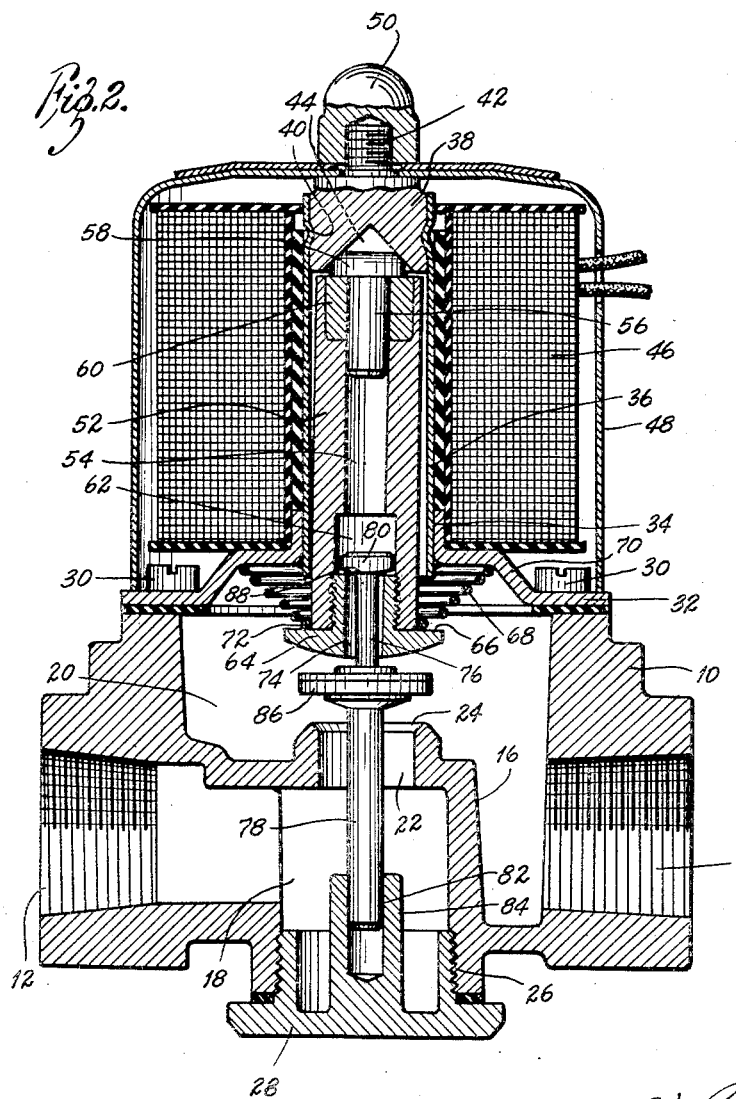
INVENTOR:
JOSEPH A. WASSER,
BY Charles E. Markham
HIS AGENT Patented Sept. 1, 1953

2,650,617

UNITED STATES PATENT OFFICE 2,650,617

ELECTROMAGNETIC VALVE

Joseph A. Wasser, Kirkwood, Mo., assignor to Missouri Automatic Control Corporation, St. Louis, Mo., a corporation of Missouri Application September 7, 1950, Serial No. 183,634

4 Claims. (Cl. 137—719)

This invention relates generally to electromagnetically actuated valves, and more particularly to electromagnetic valves of the solenoid type adapted to be operated by alternating current.

The tendency of the plunger in an alternating current operated solenoid to chatter longitudinally against its end stop and laterally against the sides of its guide sleeve when arranged for vertical reciprocation is well known and is highly objectionable in many uses of the solenoid. In attempting to overcome this objectionable chattering it has been customary to hold the inner end of a vertically arranged solenoid plunger against a magnetic end stop during current reversals by the provision of a shade, thus eliminating or minimizing the longitudinal vibration. Inasmuch however, as it is practically impossible to maintain a plunger exactly central in the magnetic field created by its surrounding coil, the plunger is therefore acted upon by unequal lateral forces which tend to cause its outer free end to chatter against one side or the other of its guide sleeve.

In the present invention it is an object to provide a generally new and improved solenoid actuated valve having a vertically arranged free falling plunger in which novel and simplified means is employed to prevent lateral vibration of the solenoid plunger when energized by alternating current.

A further object is to provide a solenoid actuated valve as above having means for centering the inner end of the plunger and for holding it against longitudinal vibrations when energized, and in which novel means is employed for applying a resilient lateral force at the outer free end of the plunger sufficient to hold it constantly against the wall of its guide sleeve when the solenoid is energized.

A further object is to provide a solenoid actuated valve having a vertically arranged loosely fitted, free falling solenoid plunger having its inner end held centrally in its guide sleeve when energized and having a relatively closely guided reciprocating valve in axial alignment therewith and operatively associated with the outer end of the plunger, in which means is provided for resiliently urging the outer end of the plunger against one side of its guide sleeve, and in which an operative connection between the outer end of the plunger and the guided valve is provided which permits relative lateral movement between the plunger and the valve.

These and further objects and purposes will become apparent upon reading the following complete description of the invention in connection with the accompanying drawing.

In the drawing;

Fig. 1 is a plan view of an electromagnetic valve constructed in accordance with the present invention;

Fig. 2 is a sectional view taken on line 2—2 of Fig. 1;

Fig. 3 is an elevation of the plunger spring shown in a free position; and

Fig. 4 is a plan view of the spring shown in Fig. 3.

The device comprises a body member 10 having an inlet 12, an outlet 14 and a partition 16 defining a lower inlet chamber 18 and an upper outlet chamber 20. The partition 16 has a port 22 therein which is surrounded by a valve seat 24. The valve body is also provided with a lower threaded bore 26 in which is threadedly engaged a threaded closure plug 28.

Attached to the upper part of valve body 10 as by screws 30 is a disc like member 32 of magnetic material. The member 32 has a central perforation 34 into which is fitted the lower end of a vertically arranged non-magnetic guide sleeve 36. The sleeve 36 is rigidly attached to member 32 as by brazing. Fitted in the upper end of the guide sleeve is a sleeve closing plug 38 of magnetic material. The plug 38 may be rigidly fastened within the sleeve 36 as by crimping the sleeve into a groove in the plug as indicated at 40.

The magnetic plug 38 is provided with an upwardly extending integral stud 42 and is further provided with a conical recess 44 in its lower surface. A winding 46 having a central opening is slidably fitted over the sleeve member 36 and an inverted cup-shaped casing member 48 of magnetic material is provided which fits over the winding 46 and has its rim abutting the periphery of member 32. The casing member 48 has a perforation in its upper closed end through which passes the stud 42, and an acorn nut 50 is provided which clamps the casing against the member 32.

Loosely fitted within the guide sleeve 36 is a solenoid plunger 52 of magnetic material which is adapted to be attracted upward to abut the lower surface of the sleeve plug 38 when the winding 46 is energized. The solenoid plunger 52 has a longitudinal bore 54 therethrough into which is pressed at the upper end of the plunger, a plug 56 of magnetic material. The plug 56 is provided with a rounded head 58 at its upper end. The rounded head 58 of plug 56 is adapted to engage the conical recess 44 in the lower surface of plug 38 thereby to center the upper end of the plunger within the sleeve member when it is attracted to its upward position. The upper end of plunger 52 is also provided with a counter bore into which is press fitted a cylindrical shading member 60 of non-magnetic conducting material.

The plunger 52 is further provided at its lower end with a counter bore 62 which is threaded at its outer end and receives in threaded engagement a threaded plug 64. The plug 64 is provided with a flange 66 which extends beyond the diameter of the plunger and against which bears the smaller lower end of a conically wound helical spring 68.

The upper larger end of the conical spring 68 bears against the under surface of the member 32 and is retained against lateral movement in a dish-shaped recess 70 formed in the member 32 and which recess is concentric with the sleeve member 36. Spring 68 is provided with an integral end loop at its smaller lower end which is formed eccentrically with the remainder of the spring as is indicated in Figs. 3 and 4. This end loop 72 closely fits the plunger 52 and normally urges the plunger downwardly and laterally against one side of the sleeve member 36.

The plunger plug 64 is further provided with a longitudinal bore 74 through which passes the upper reduced end 76 of a valve stem 78. The valve stem portion 76 is provided at its upper end with a head 80. The lower end of the valve stem 78 is guided in a bore 82 which is concentric with the guide sleeve 36. The guide bore 82 is drilled in a boss 84 which is formed as part of the body closure plug 28. Attached to the valve stem 78 at a point intermediate of its ends is a disc valve 86 adapted to engage the valve seat 24.

The bore 74 in the plunger plug 64 is sufficiently larger in diameter than the upper portion of valve stem 76 to permit the lateral movement of the outer end of the loosely fitted plunger 52 into engagement with the wall of the guide sleeve 36 without any binding of the valve stem. The under surface of the head 80 on the upper end of the valve stem is formed spherical as indicated at 88 so as to localize its contact with the upper end of plunger closure plug 64 and the lower surface of plunger closure plug 64 is formed spherical so as to localize its contact with the upper surface of the valve 86.

*In operation*

When the winding 46 is energized the plunger 52 is attracted upward to the position as shown in Fig. 2. As the plunger moves upwardly the rounded head of magnetic plug 56 engages the tapered sides of the conical recess 40 causing the upper or inner end of the plunger to be centered in the sleeve member 36. The lower end of the plunger, however, is resiliently urged laterally against one side of the guide sleeve 36 by the spring 68 with sufficient force to hold it against lateral vibration. As the plunger is moved upward the valve 86 is lifted from its seat due to engagement of the upper end of plunger plug 64 with the lower surface of valve stem head 80. The valve and valve stem are retained in axial alignment with the valve seat 24 and the guide sleeve 36 by reason of the lower end of the valve stem being guided in the concentric bore 82. The plunger when energized is therefore centered at its upper end in the sleeve member and held against longitudinal vibration by the shade 60 and is held firmly against its guide sleeve against lateral vibration by the spring 68.

Upon deenergization of winding 46 the plunger is released and falls by gravity and by the downward urging of spring 68. As the plunger falls the lower surface of plunger plug 64 engages the valve 86 and presses it in engagement with its seat 24.

The foregoing description is intended to be illustrative and not limiting, the scope of the invention being set forth in the appended claims.

I claim:

1. In an electromagnetic valve, a sleeve member having an outer and inner end, an energizing coil around said sleeve member, an elongated plunger loosely fitted in said sleeve member and adapted to be attracted inwardly into said sleeve member when said coil is energized, means at the inner end of said sleeve member for centering the inner end of said plunger in said sleeve member when it is in an attracted position, spring means for resiliently biasing the outer end of said plunger against one wall of said sleeve member, a valve port adjacent the outer end of said sleeve member having a surrounding valve seat which is concentric with said sleeve member, a valve stem extending through said port and being operatively connected at one end to the outer end of said plunger, means at the other end of said valve stem for guiding it in a path concentric with said valve seat and said sleeve member, and a valve rigidly attached to said stem intermediately of its ends and being adapted to engage said valve seat, said operative connection between said valve stem and said plunger being constructed with sufficient free lateral movement between said valve and said plunger to permit the tilting of said plunger by said spring without binding said valve in its guide.

2. In an electromagnetic valve, a disc member having a central perforation, a sleeve member having an open end extending into said perforation at one side of said disc and being fixed to said disc member, an annular recess in said disc member on the other side thereof and surrounding the open end of said sleeve and being concentric therewith, an energizing coil around said sleeve member, an elongated plunger loosely fitted in said sleeve member and adapted to be attracted inwardly into said sleeve when said coil is energized, means at the other end of said sleeve for centering the inner end of said plunger therein when in an attracted position, a flange on the outer end of said plunger, a frusto-conical helically wound spring surrounding the outer end of said plunger having an eccentric loop at its smaller end closely fitting said plunger and bearing against said flange and having an end loop at its larger end concentric with the main body of the spring and bearing against said disc member and adapted to substantially fit into said recess, whereby said plunger is normally urged longitudinally in an outward direction and laterally against one wall of said sleeve member, a valve port adjacent the outer end of said plunger having a surrounding valve seat concentric with said sleeve member, a valve stem extending through said port and being operatively connected at one end to the outer end of said plunger, means at the other end of said valve stem for guiding it in a path concentric with said sleeve member and valve seat, and a valve rigidly attached to said valve stem intermediately of its ends and being adapted to engage said valve seat, said operative connection between said valve stem and said plunger being constructed and arranged with sufficient free lateral movement between said valve stem and said plunger to permit the tilting of said plunger caused by said spring without binding said valve stem in its guide.

3. In an AC solenoid a disc member having a central perforation, a sleeve member having an open end extending into said perforation at one side of said disc and being fixed to said disc member, an annular recess in said disc member on the other side thereof and concentric with said sleeve member, an energizing coil around said sleeve member, an elongated plunger loosely fitted in said sleeve member and adapted to be attracted inwardly into said sleeve member when said coil is energized, means at the other end of said sleeve member for centering the inner end of said plunger therein when in an attracted position, a flange on the outer end of said plunger, and a helically wound spring surrounding the outer end of said plunger and having an eccentric end loop at one end closely fitting said plunger and bearing against said flange and having an end loop at its other end concentric with the main body of the spring bearing against said disc member and adapted to substantially fit into said recess, whereby said plunger is normally urged longitudinally in an outward direction and laterally against one wall of said sleeve member.

4. In an AC solenoid, a base member having a central perforation, a sleeve member having a closed end and an open end and having its open end extending into said perforation at one side of said base member and being fixed to said base member, an annular recess in said base member on the other side thereof and concentric with the open end of said sleeve member, an energizing coil around said sleeve member, an elongated plunger loosely fitted in said sleeve member and adapted to be attracted inwardly when said coil is energized, means at the closed end of said sleeve member for centering the inner end of said plunger when in an attracted position, a flange on the outer end of said plunger, and a frusto-conical helically wound spring surrounding the outer end of said plunger, the large end of said spring being seated in said concentric recess in said base member, the small end of said spring having a circularly formed end loop which is eccentric with the longitudinal center line of the spring, which eccentric end loop closely fits said plunger and bears longitudinally against said flange, whereby the outer end of said plunger is constantly urged longitudinally outward from said sleeve member and laterally against one wall of said sleeve member.

JOSEPH A. WASSER.

References Cited in the file of this patent
UNITED STATES PATENTS

| Number | Name | Date |
|---|---|---|
| 1,822,668 | Protzeller | Sept. 8, 1931 |
| 2,291,599 | Ray | Aug. 4, 1942 |
| 2,389,111 | Dillman | Mar. 13, 1945 |
| 2,458,123 | Wasserlein | Jan. 4, 1949 |
| 2,493,386 | Cairns | Jan. 3, 1950 |